UNITED STATES PATENT OFFICE.

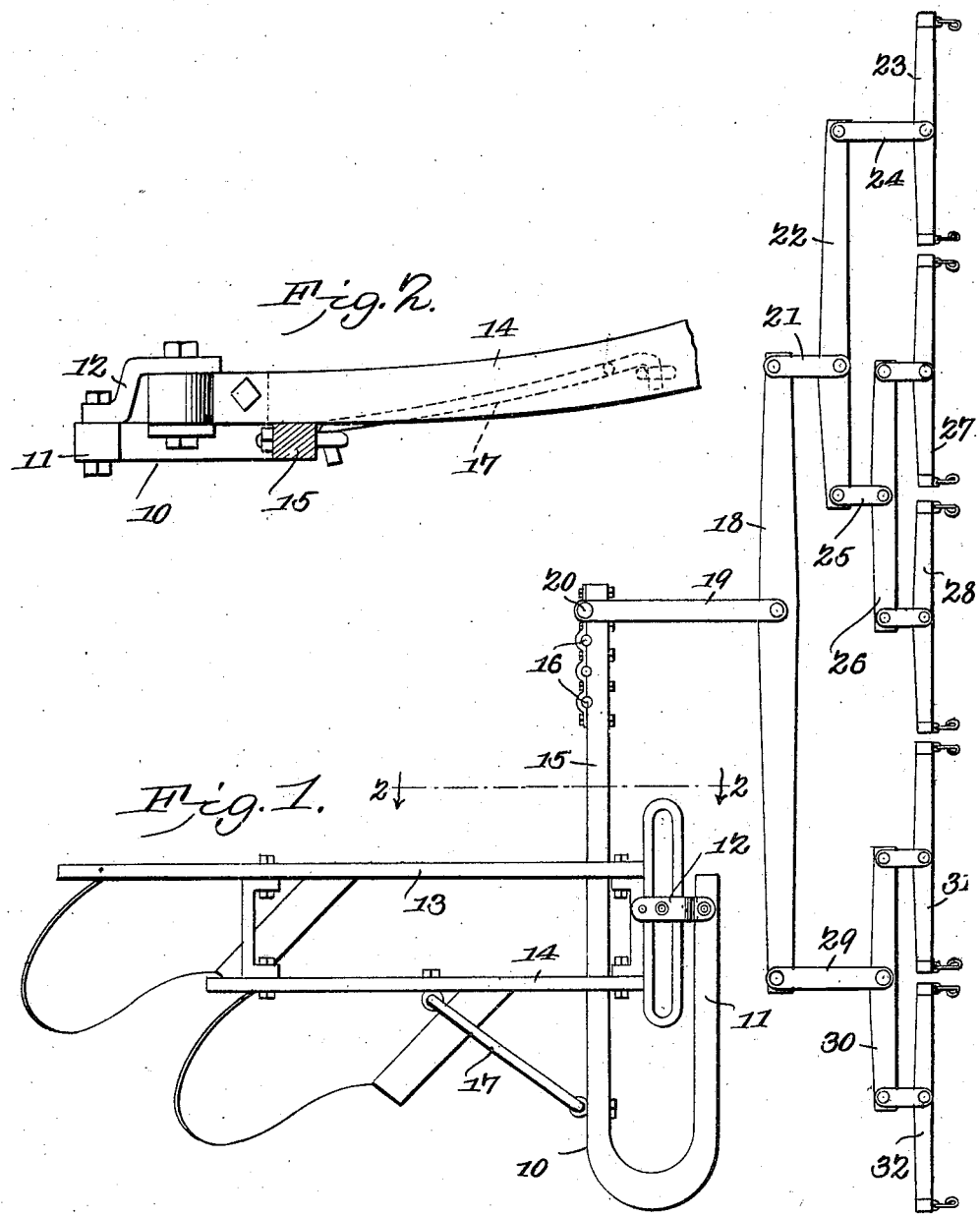

WILLIAM WILSON, OF GARFIELD, KANSAS.

DRAFT-EQUALIZER.

No. 847,389. Specification of Letters Patent. Patented March 19, 1907.

Application filed March 26, 1906. Serial No. 308,154.

*To all whom it may concern:*

Be it known that I, WILLIAM WILSON, a citizen of the United States, residing at Garfield, in the county of Pawnee and State of Kansas, have invented a new and useful Draft-Equalizer, of which the following is a specification.

This invention relates to draft-equalizers employed upon gang-plows, harvesters, and similar implements or machines, but is more particularly designed for use upon gang-plows wherein a plurality of horses are used, and for the purpose of illustration the device is shown applied to a conventional gang-plow structure and arranged for five draft-animals.

The object of the invention is to provide a simply-constructed and easily-applied device wherein a plurality of draft-animals may be employed and so arranged that one only is required to walk in the furrow and the remainder upon the unplowed land, and none of the animals are required to walk upon plowed land, and when employed upon harvesters or similar machines all the animals walk in the stubble, and none walk in the grain.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a plan view of the improved device applied. Fig. 2 is an enlarged section reversed in position on the line 2 2 of Fig. 1.

The improved device comprises a clevis member 10 in U shape, with the arms of unequal length, the shorter arm 11 coupled at 12 to the beams 13 and 14 of a gang-plow and the longer arm 15 provided at its terminal with a plurality of spaced sockets 16 for adjustably receiving the coupling means of the equalizer mechanism.

The clevis 10 is connected to the furrow or moldboard side of the beam 14 by a brace 17. The equalizer mechanism consists of the main beam 18, coupled by a link 19 to the longer arm 15 of the clevis 10, and at 20 adjustably coupled to any one of the sockets 16. Connected at one end of the beam 18 by a link 21 is an equalizer-bar 22, to one end of which a swingletree 23 is coupled by a link 24, and coupled to the other end by a link 25 is a doubletree 26, the latter carrying swingletrees 27 28.

Coupled by a link 29 to the other end of the main beam 18 is a doubletree 30, having swingletrees 31 32 coupled thereto in the usual manner.

The longer arm 15 of the clevis member 10 is so arranged that when the beam 18 with its attachments is coupled thereto the swingletree 32 will be so disposed that the draft-animal connected thereto will travel in the furrow of the plow attached to the beam 14, while the remaining draft-animals will travel upon the "land," as will be obvious.

It will thus be noted that the draft is equalized and that all the animals pull with substantially the same force and that all side draft is practically obviated. The plurality of sockets 16 permit the beam to be adjusted to adapt the device to animals of different strength and size.

The clevis 10 is preferably of metal and reinforced or thickened at the bend to prevent deflection at that point under the strains to which it will be subjected.

The clevis portion of the device is readily adapted to the various forms of machines in which a plurality of draft-animals are employed and wherein it is required that the major portion thereof shall travel at one side of the center of the machine, as will be obvious, and by varying its length and size it may be adapted without material structural change to different forms of machines.

Having thus described the invention, what is claimed is—

1. In an apparatus of the class described, a clevis comprising a U-shaped member having arms of unequal length, means for coupling the structure to be drawn forward to the shorter arm of the clevis member, means for coupling the draft appliances to the longer arm of the clevis member, and a brace between said structure and clevis.

2. In an apparatus of the class described, a clevis comprising a U-shaped member having arms of unequal length, means for coupling the structure to be drawn forward to the shorter arm of the clevis member, means for coupling the draft appliances to the longer arm of the clevis member, and a brace connected at one end to said clevis near the juncture of the arms and at the other end to said structure.

In testimony that I claim the foregoing as my own I have hereto affixed my signature in the presence of two witnesses.

WILLIAM WILSON.

Witnesses:
 ED TOMLINSON,
 DAVID TOMLINSON.